No. 638,738. Patented Dec. 12, 1899.
T. W. MORRIS.
METHOD OF AND MACHINE FOR PRODUCING HOLLOW RUBBER ARTICLES.
(Application filed Oct. 17, 1898.)
(No Model.)
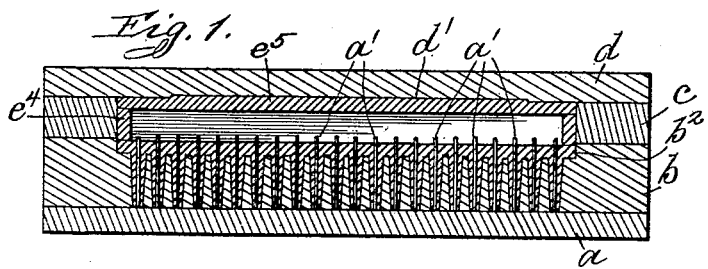
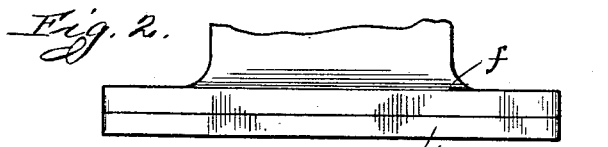
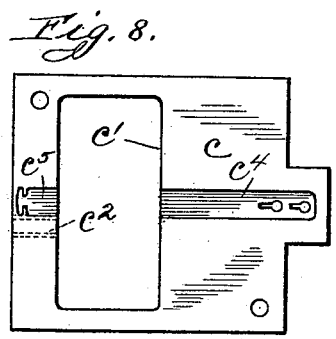
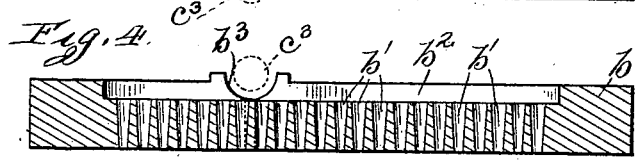
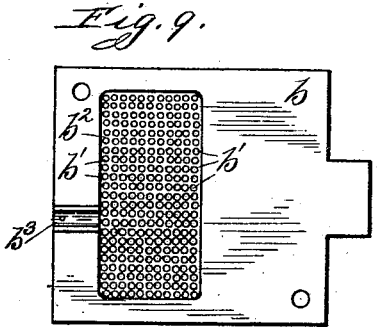
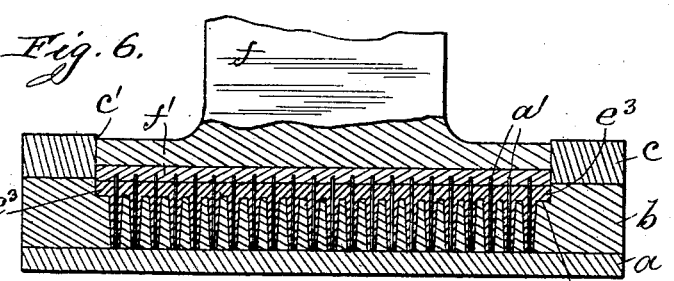
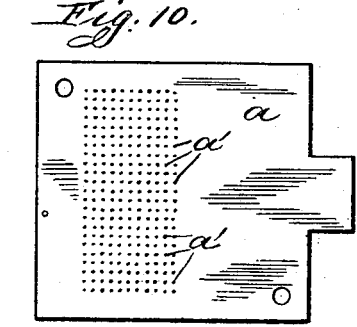
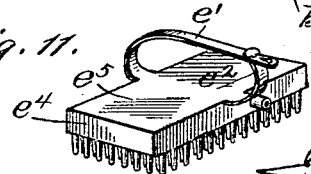
Witnesses:
R. J. Jacker.
M. R. Rochford.
Inventor:
Thomas W. Morris
By Ludington & Jones
Attorneys.
THE NORRIS PETERS CO., PHOTO-LITHO., WASHINGTON, D. C.

UNITED STATES PATENT OFFICE.

THOMAS W. MORRIS, OF CHICAGO, ILLINOIS, ASSIGNOR TO BURTON D. KNICKERBOCKER, OF SAME PLACE.

METHOD OF AND MACHINE FOR PRODUCING HOLLOW RUBBER ARTICLES.

SPECIFICATION forming part of Letters Patent No. 638,738, dated December 12, 1899.

Application filed October 17, 1898. Serial No. 693,744. (No model.)

*To all whom it may concern:*

Be it known that I, THOMAS W. MORRIS, a citizen of the United States, residing at Chicago, in the county of Cook and State of Illinois, have invented a certain new and useful Improvement in Methods of and Machines for Producing Hollow Rubber Articles, of which the following is a full, clear, concise, and exact description, reference being had to the accompanying drawings, forming a part of this specification.

My invention relates to a method of and machine for producing hollow rubber articles, my object being to provide a method and apparatus whereby a rubber article may be readily formed having a hollow interior and having projections of considerable length upon the face thereof.

My invention has been particularly designed for the production of rubber bathbrushes having a hollow back or body adapted to be connected with a source of water-supply and having upon one face a series of hollow teeth or projections constituting the scrubbing-surface and communicating with the receptacle in the back or body of the brush. Although particularly designed for the manufacture of this article, my invention is equally applicable to the production of other articles of the same general structure and requirements.

In accordance with my invention I provide a mold comprising a series of separable plates, the mold being so formed that a body of plastic rubber may first be placed therein and subjected to pressure to laterally displace the rubber and press the same into a series of apertures to form a series of hollow teeth or projections which constitute the scrubbing-surface of the brush, after which a separately-formed body of rubber is inserted in the mold to constitute the hollow back, the mold being then subjected to heat to expand a volume of water which has been previously placed within the hollow back, and thus subject the rubber to pressure from within while in the presence of the heat, thereby vulcanizing the rubber and causing the same while plastic to flow into the small recesses which may be provided for the purpose of imparting a design or configuration to the brush. A hollow brush with projecting teeth is thus formed in a single piece.

I have illustrated my invention in the accompanying drawings, in which—

Figure 1 is a sectional view of the mold, showing the mold and the brush therein in section. Fig. 2 is a view of the plunger. Figs. 3, 4, and 5 are views of the several plates constituting the mold. Fig. 6 is a view showing the plunger in its lowered position. Fig. 7 is a face view of the top plate of the mold. Figs. 8 and 9 are plan views of the intermediate plates of the mold. Fig. 10 is a plan view of the bottom plate of the mold. Fig. 11 is a perspective view of the completed brush.

Like letters refer to like parts in the several figures.

The mold comprises a lower plate $a$, carrying upon the upper surface a series of pins $a'$ $a'$. A plate $b$ is adapted to rest upon the top of plate $a$ and carries a series of tapering holes or openings $b'$ $b'$, extending through the plate, and is cut away upon the upper face to form a depression $b^2$, having the contour of the body of the brush. The openings $b'$ $b'$ correspond in position to the pins $a'$ $a'$, so that when the plates are placed together, as shown in Figs. 1 and 5, the pins will occupy axial positions within the openings $b'$ and will extend upward a short distance above the upper ends of said openings. Upon the plate $b$ a plate $c$ is adapted to be placed, having an opening $c'$ of the contour of the body of the brush which is to be molded. A transverse opening $c^2$ is provided in the plate $c$, adapted to coact with the transverse opening $b^3$ in the plate $b$ to form a circular opening when the plates are placed together, within which a pin $c^3$ may be placed, whereby the rubber flowing around the same may form a projecting tube to constitute the inlet-duct for permitting water to pass to the interior of the body of the completed brush when in use. On the upper face of the plate $c$ channels $c^4$ $c^5$ are placed for the reception of rubber strips, which are adapted to form straps $e'$ $e^2$ to constitute the handle of the brush. Upon the top of the plates as thus assembled a plate $d$ is adapted to be placed, the plate $d$ carrying upon its face a design $d'$ or any configuration which it is desired to impart to the upper face of the brush.

In forming the brush the plates $a$ $b$ $c$ are placed together, as shown in Fig. 6, and a body of soft rubber $e^3$ is placed within the mold, the rubber having been previously heated, whereby it is plastic, and the plunger $f$ is then moved downward, entering the openings $c'$ $b^2$ of the plates $c$ and $b$ and compressing the body of rubber within the mold. The plunger $f$ conforms in shape to the shape of the opening $c'$ of the plate $c$, so that the rubber cannot pass out around the edges of the plunger. As the plunger descends it compresses the body of soft rubber and laterally displaces the same to cause the rubber to flow into the openings $b'$ $b'$ in the plate $b$ and around the pins $a'$. The face of the plunger $f$ is formed of a body $f'$ of wood or other soft material, which will permit the ends of the pins $a'$ to pass into the same, whereby upon the withdrawal of the plunger the pins $a'$ will be left projecting slightly above the upper surface of the body of rubber. After the plunger $f$ has been withdrawn a body of rubber $e^4$ is placed around the walls of the mold to form the peripheral wall of the body of the brush, the body of rubber $e^4$ having been previously heated and being pressed into intimate contact with the body of rubber $e^3$ by manual pressure. The body of rubber $e^4$ carries on one side a tube-like projection, of rubber, adapted to fit in the openings $c^2$ $b^3$, and within which the pin $c^3$ is placed, this short tube serving as the inlet-duct of the completed brush. A flat plate of rubber $e^5$ is then placed upon the top of the wall, and manual pressure is exerted to bring the bodies of rubber into intimate contact. The body of rubber $e^5$ carries laterally-extending strips $e'$ $e^2$, adapted to lie in the channels $c^4$ $c^5$ in the plate $c$, and which when secured together at the ends constitute the handle or strap of the completed brush. Instead of applying the bodies $e^4$ $e^5$ to the mold separately they may in some instances be formed in a single piece—as, for instance, when the strips $e'$ $e^2$ are omitted. The upper plate $d$ is next placed in position, and the mold is placed in an oven or furnace and subjected to heat, a small quantity of water having been sprinkled upon the body of rubber $e^3$ before placing the body of rubber $e^5$ in position. The heat vaporizes the water thus placed in the interior of the brush, and the expansion thus produced subjects the rubber to a high pressure from within, thereby bringing the joints between the soft bodies of rubber into intimate contact during the application of heat, which vulcanizes the rubber and forms the same into one piece, and the pressure, furthermore, forces the plastic rubber outward and causes the same to fill all of the recesses and crevices constituting the design which is formed on the face of the plate $a$. At the completion of this heating process the plates $d$ and $c$ may be removed and the brush withdrawn from the mold.

Having described my invention, what I claim as new, and desire to secure by Letters Patent, is—

1. The herein-described method which consists in subjecting a body of rubber while in the plastic state to pressure upon the opposite sides thereof and constraining the flow of the rubber in the direction of pressure except at intervals upon one side whereby the rubber is caused to laterally flow to form laterally-projecting portions on one face of said body, applying a separately-formed body of rubber to the other face thereof to form a hollow body, and then heating the rubber to vulcanize the same and subjecting the body to fluid-pressure from within and limiting the outward flow of the rubber, substantially as described.

2. The herein-described method of forming a hollow rubber bath-brush which consists in subjecting a body of rubber while in the plastic state to pressure to laterally displace portions of the rubber and form a series of hollow teeth or projections, applying thereto a peripheral rim of rubber, applying to said second body of rubber a plate of rubber to form the back and leave a hollow body, and then heating said rubber to vulcanize the same and join said bodies together and at the same time subjecting the body to pressure from within and limiting the outward flow of the rubber, substantially as described.

3. A mold for rubber articles provided with a receptacle conforming to the body of the article to be molded, and having recesses extending therefrom, and a series of pins of less diameter than the recesses extending through the several recesses, substantially as described.

4. A mold for rubber articles having a receptacle conforming to the body of the article to be molded, and having recesses extending therefrom and a series of pins of less diameter than the recesses extending through the several recesses, and a plunger adapted to fit in said receptacle to compress the rubber therein, substantially as described.

5. A mold for rubber articles having a receptacle conforming to the body of the article to be molded, and having recesses extending therefrom and a series of pins extending through the several recesses, a plunger adapted to fit in said receptacle to compress the rubber therein and a facing for said plunger adapted to permit the embedding of the ends of said pins therein when the plunger is in the inner position, substantially as described.

6. The combination with a plate provided with a series of recesses and a plate carrying pins extending through said recesses, of a plate provided with a receptacle conforming to the shape of the body of the article to be molded, said plates being cut away along their faces of contact to permit the formation of a transverse opening, substantially as described.

7. The combination with a plate provided with a receptacle conforming to the body of the article to be molded and having a series of recesses extending therefrom and a plate carrying a series of pins extending through said recesses, of an upper plate, transverse channels being provided between the face of said upper and lower members to permit the formation of laterally-extending straps on the body of the article to be molded, substantially as described.

8. In a mold, the combination with a plate carrying a series of pins, of a second plate carrying a series of tapering holes through which the pins pass, a plate carrying an opening conforming to the body of the molded article, and the top plate, substantially as described.

In witness whereof I have hereunto subscribed my name in the presence of two witnesses.

THOMAS W. MORRIS.

Witnesses:
W. CLYDE JONES,
M. R. ROCHFORD.